United States Patent [19]

Ribeiro

[11] Patent Number: 5,299,595
[45] Date of Patent: Apr. 5, 1994

[54] TWO-WAY DRAINING VALVE FOR COFFEE MAKING MACHINES

[75] Inventor: Valdemar M. Ribeiro, Matoshinhos, Portugal

[73] Assignee: Briel - Industria de Electrodomesticos, S.A., Portugal

[21] Appl. No.: 77,030

[22] Filed: Jun. 16, 1993

[30] Foreign Application Priority Data

Dec. 9, 1992 [PT] Portugal .................................. 8668

[51] Int. Cl.[5] .......................................... F16K 15/04
[52] U.S. Cl. ...................................... 137/107; 99/300; 137/517; 137/843
[58] Field of Search ................ 99/293, 300; 137/107, 137/517, 843

[56] References Cited

U.S. PATENT DOCUMENTS

| | | | |
|---|---|---|---|
| 3,322,145 | 5/1967 | Prosser | 137/517 |
| 4,258,801 | 3/1981 | Poston | 137/843 X |
| 4,700,732 | 10/1987 | Fracisco | 137/107 |

FOREIGN PATENT DOCUMENTS 759867 11/1932 France .................................. 137/107

*Primary Examiner*—Robert G. Nilson
*Attorney, Agent, or Firm*—Laubscher & Laubscher

[57] ABSTRACT

A two-way draining valve for coffee making machines includes an L-shaped housing containing a chamber, an inlet opening for delivering water to the chamber from a pump, an outlet opening arranged in an upper leg of the housing for delivering water from the chamber to a boiler inlet, and a draining bore arranged in a lower leg of the housing and communicating with the chamber. A spherical rubber valve ball is arranged within the chamber and is movable with respect to the draining bore in response to changes in pressure in the chamber. The ball opens and closes the draining bore in accordance with the chamber pressure to enable excess steam and water from the boiler and the pump, and excess air from the pump to exit the chamber via the draining bore. Thus, pressure within the boiler is controlled to prevent dripping of the coffee making machine.

10 Claims, 1 Drawing Sheet

*(page 1 / 2)*

TWO-WAY DRAINING VALVE FOR COFFEE MAKING MACHINES

BACKGROUND OF THE INVENTION

With increases in coffee consumption comes an increase in the demand for coffee making machines. These machines require periodic maintenance, with maintenance being required more frequently for machines which are used more often. Normally, the maintenance results in a period of downtime which is inconvenient for the users of the machine, particularly restaurants and other commercial establishments.

Typically, the maintenance required is to prevent dripping from the spout of the coffee making machine. The dripping is usually due to excess pressure within the heating unit or boiler of the machine, or to the buildup of calcareous deposits on the draining valve seat. Excessive dripping drains the water tank and causes the water pump to become unloaded or unprimed.

The present invention relates to a two-way draining valve which prevents excess pressure within the boiler, thus avoiding dripping of the spout and solving the problem of pump unloading.

SUMMARY OF THE INVENTION

Accordingly, it is a primary object of the invention to provide a two-way draining valve including an L-shaped housing containing a chamber within which is arranged a spherical rubber ball which is movable therein. At the bottom of the chamber, the housing contains a draining bore designed to drain steam or water which builds up in the chamber from the boiler or to drain air existing in the pump water feed circuit. The spherical ball at least partially closes the draining bore owing to the force of gravity.

Whenever the water tank is empty, there is a risk that the pump water feed circuit will also become empty resulting in dry running of the pump and allowing air to enter the system which makes it impossible for the system to function properly. With the two-way draining valve of the invention, the pump is automatically bled every time there is air within the pump circuit.

Thus, once the pump is loaded or primed, the water in the water tank which is provided by the pump is fed into the chamber through an inlet opening. From the chamber, the water passes through an outlet opening to a tube leading to the boiler tank of the coffee making machine.

BRIEF DESCRIPTION OF THE DRAWING

Other objects and advantages of the invention will become apparent from a study of the following specification when viewed in the light of the accompanying drawing, in which:

FIG. 2b is a sectional view taken along line 2b—2b of FIG. 2a;

FIG. 3b is a sectional view taken along line 3b—3b of FIG. 3a;

FIG. 4b is a sectional view taken along line 4b—4b of FIG. 4a.

DETAILED DESCRIPTION

Figure 1:
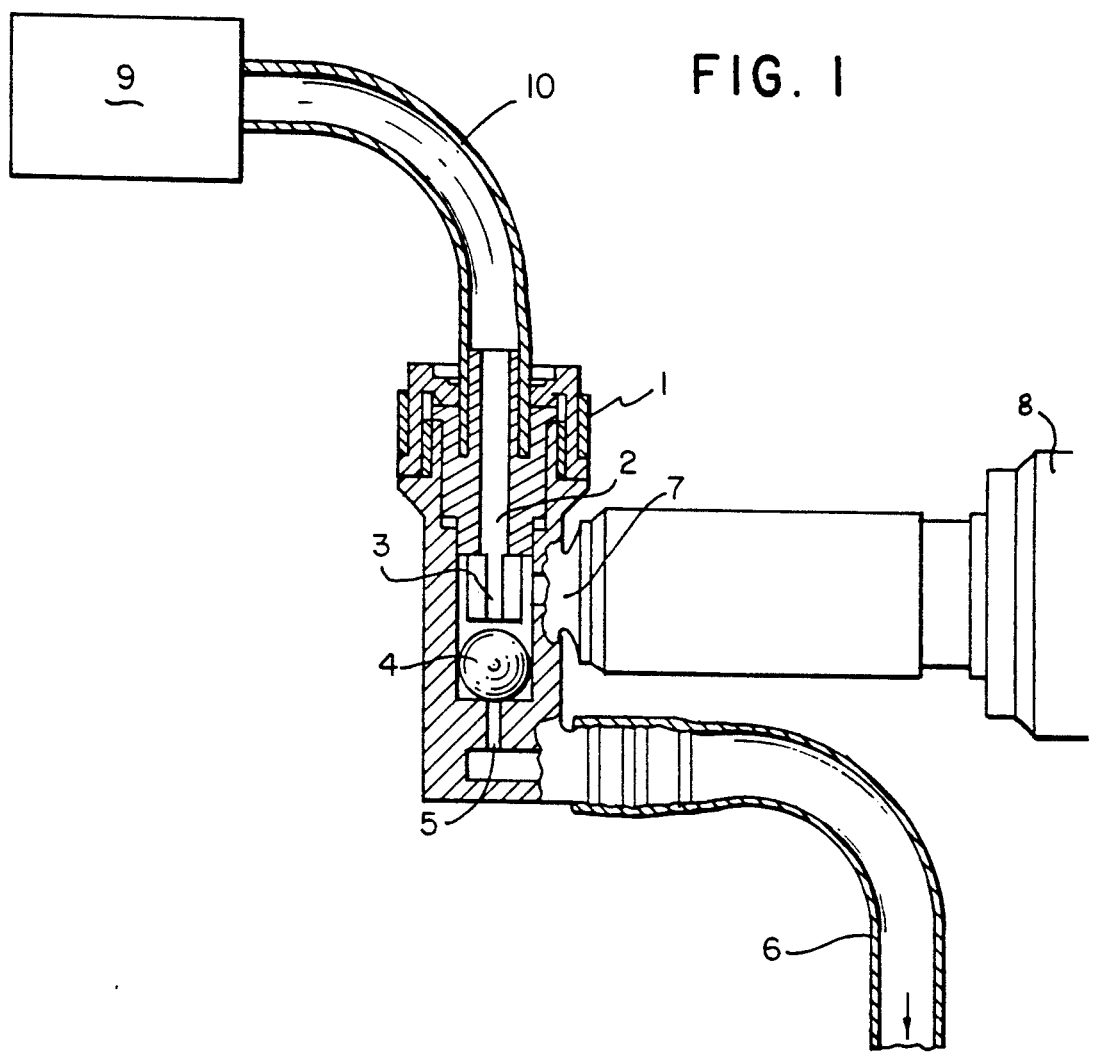
FIG. 1 is a front cross sectional view of the two-way draining valve according to the invention.

The two-way draining valve for coffee making machines according to the invention will first be described with reference to FIG. 1. It comprises an L-shaped housing 1 containing a chamber 3 within which is arranged a flexible rubber sphere or ball 4. The housing contains a water inlet bore 7 for delivering water from a pump 8 through a tube connected with a water tank (not shown). The water enters the chamber 3 via the water inlet bore 7 and exits the chamber via a water outlet bore 2 arranged in the upper leg of the housing. The outlet bore 2 is connected with a tube 10 to supply water to the inlet 9 of a heating unit or boiler of the coffee making machine.

The lower leg of the housing contains a draining bore 5 communicating with the chamber for draining excess steam or water from the chamber to the water tank through a drain tube 6 as will be developed in greater detail below.

Figure 2A:
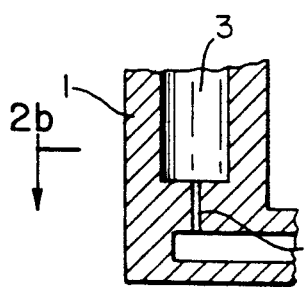
FIG. 2a is a detailed sectional view of the draining bore according to a preferred first embodiment of the invention.
Figure 3A:
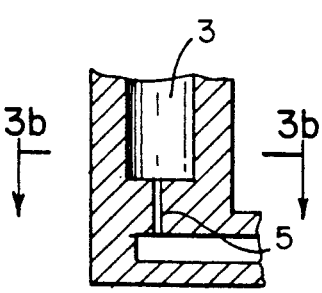
FIG. 3a is a detailed sectional view of the draining bore according to a second embodiment of the invention.
Figure 2B:
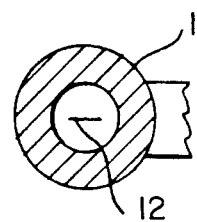
Figure 3B:
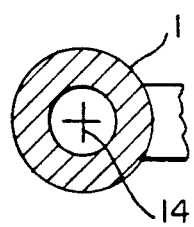

According to a preferred embodiment of the invention, the housing 1 includes a convex surface defining the bottom of the chamber 3, with an opening to the draining bore 5 being provided in the convex surface. As shown in FIGS. 2a and 2b, the opening to the draining bore comprises a slit 12 in the convex surface. In an alternative embodiment of FIGS. 3a and 3b, the opening comprises a pair of intersecting slits 14 arranged normal to each other in a cross-hair configuration.

Figure 4A:
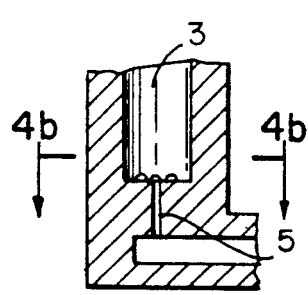
FIG. 4a is a detailed sectional view of the draining bore according to a third embodiment of the invention.
Figure 4B:
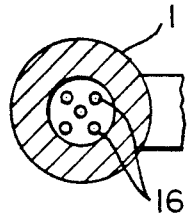

In the embodiments of FIGS. 1-3, the convex surface at the bottom of the chamber 3 is smooth. According to the embodiment of FIGS. 4a and 4b, however, a plurality of projections 16 may be provided around the opening to the draining bore 5.

The draining bore 5 can be used to drain excess pressure from the boiler as follows. The pump 8 supplies water to the boiler (not shown) via the two-way draining valve. More particularly, the water is supplied to the chamber of the valve under pressure via the inlet bore 7. The pressure of the water compresses the rubber spherical ball against the convex surface at the bottom of the chamber to effectively close the draining bore 5.

The water from the chamber thus flows into the upper leg of the valve housing and is supplied to the boiler via the water outlet bore 2 of the valve housing and the tube 10. Once the boiler is full, the water pump 8 is disconnected and the heater of the boiler is turned on. With the heating of the water inside the boiler, a portion of the water is converted to steam in a gaseous state, resulting in an increase of volume and pressure within the boiler. When a given maximum pressure is reached, the steam returns to the valve chamber 3 via the tube 10 and outlet bore 2.

With the pump off, the spherical ball 4 is movable within the chamber. The steam entering the chamber from the boiler via the outlet causes the ball to rest but not compress against the lower convex surface to partially close the draining bore. Since the bore has an opening comprising a slit, or crosshairs (FIGS. 2 and 3) and/or because the surface has projections (FIG. 4), the ball does not completely close the draining bore, whereby excess steam or water may exit the chamber via the draining bore 5 and drain tube 6 to the water tank. This draining function relieves the excess pressure in the boiler.

The draining bore 5 can also be used to drain air from the water supply circuit. When the pump starts running free with no water in the system or tank, air is delivered into the chamber 3 causing the spherical ball to vibrate within the chamber, thereby opening the draining bore 5 to allow the air to exit the chamber. After all of the air has been evacuated, water flows into the chamber through the inlet bore 7 from the pump 8, compressing the spherical ball 4 against the convex surface. The compressed ball closes the draining bore 5 to obstruct the water from exiting the chamber and puts the system back in working order with the pump reprimed. Only a small amount of water is passed through the drain opening to the drain tube 6 before the opening is closed by the compressed ball.

With the two-way draining valve of the invention, dripping of water from the spout of the coffee making machine due to excess pressure in the boiler is avoided and automatic re-priming of the pump is provided when the water supply is temporarily interrupted.

The valve is easy to assemble and can be mounted on new coffee making machines or retrofit on existing machines.

What is claimed is:

1. A two-way draining valve for coffee making machines, comprising
   (a) an L-shaped housing containing a chamber, an inlet opening for delivering water to said chamber from a pump, an outlet bore arranged in an upper leg of said housing for delivering water from said chamber to a boiler inlet, and a draining bore arranged in a lower leg of said housing and communicating with said chamber; and
   (b) a spherical valve ball arranged within said chamber, said valve ball being movable with respect to said draining bore in response to changes in pressure within said chamber to enable excess steam from the boiler, water from the pump, and air to exit said chamber via said draining bore, thereby to control the pressure within the boiler and prevent dripping of the coffee making machine.

2. A two-way draining valve as defined in claim 1, wherein said valve ball vibrates within said chamber in response to steam effervescence from the boiler and excess water from the pump, the vibration of said valve ball periodically opening said draining bore, whereby the steam and water are drained from said chamber through said draining bore to a water tank.

3. A two-way draining valve as defined in claim 2, wherein said valve ball vibrates within said chamber in response to air supplied to said chamber when the pump is running free, the vibration of said valve ball periodically opening said draining bore, whereby excess air exits said chamber via said draining bore to the tank to allow for priming of the pump.

4. A two-way draining valve as defined in claim 1, wherein said housing includes a convex surface surrounding said draining bore at the bottom of said chamber.

5. A two-way draining valve as defined in claim 4, wherein said convex surface is smooth.

6. A two-way draining valve as defined in claim 5, wherein said convex surface contains a slit communicating with said draining bore.

7. A two-way draining valve as defined in claim 5, wherein said convex surface contains a pair of intersecting slits arranged normal to each other in a cross-hair configuration and communicating with said draining bore.

8. A two-way draining valve as defined in claim 4, wherein said convex surface contains a plurality of projections surrounding said draining bore.

9. A two-way draining valve as defined in claim 8, wherein said convex surface contains a slit communicating with said draining bore.

10. A two-way draining valve as defined in claim 8, wherein said convex surface contains a pair of intersecting slits arranged normal to each other in a cross-hair configuration and communicating with said drain bore.

* * * * *